United States Patent

Harrison et al.

[11] 4,219,097
[45] Aug. 26, 1980

[54] EXTERNAL AIR RELEASE CONTROL IN SEISMIC AIR GUN

[75] Inventors: Earnest R. Harrison, Plano; Roy C. Johnston, Richardson, both of Tex.

[73] Assignee: Texas Instruments Incorporated, Dallas, Tex.

[21] Appl. No.: 26,977

[22] Filed: Apr. 4, 1979

[51] Int. Cl.² .......................... G01V 1/38; G01V 1/14
[52] U.S. Cl. .................................. 181/120; 181/115; 367/144
[58] Field of Search ............... 367/144; 181/110, 115, 181/118, 120; 116/137 R

[56] References Cited

U.S. PATENT DOCUMENTS

| 3,249,177 | 5/1966 | Chelminski | 181/120 |
| 3,379,273 | 4/1968 | Chelminski | 181/118 |
| 3,638,752 | 2/1972 | Wakefield | 367/144 |
| 3,653,460 | 4/1972 | Chelminski | 181/120 |
| 3,997,021 | 12/1976 | Chelminski | 367/144 |
| 4,098,369 | 7/1978 | Altschuler et al. | 181/120 |
| 4,114,723 | 9/1978 | Paitson et al. | 181/120 |

FOREIGN PATENT DOCUMENTS

| 2175467 | 10/1973 | France | 181/120 |
| 197707 | 11/1977 | U.S.S.R. | 181/118 |

*Primary Examiner*—Nelson Moskowitz
*Attorney, Agent, or Firm*—Thomas G. Devine; Leo N. Heiting; Melvin S. Sharp

[57] ABSTRACT

Disclosed is a seismic source device, known in the industry as an air gun, having shuttle and external sliding valve control for allowing a predetermined discharge of compressed air into water for purposes of seismic exploration. The shuttle is controlled by air pressure to move it upward, thereby permitting compressed air in the firing chamber to exhaust through exhaust ports. The external sliding valve had been held in a downward position by air pressure supplied from the firing chamber, compressing a spring. As the firing chamber pressure drops, the compressed spring expands, forcing the sliding valve to move upward, closing the exhaust ports. By preventing further discharge of air, secondary pulses are greatly reduced, with little or no loss in acoustic output, thereby enhancing the operation of the entire system. Further, by preventing all the air in the firing chamber from being discharged, the system becomes more efficient and more cost effective.

9 Claims, 4 Drawing Figures

EXTERNAL AIR RELEASE CONTROL IN SEISMIC AIR GUN

BACKGROUND OF THE INVENTION

This invention relates to seismic source devices and more particularly to a shuttle and external sliding valve controlled seismic source device which allows only a portion of the air found in the firing chamber of the device from being discharged into the surrounding environment.

In marine seismic exploration, a source of acoustic energy is released into the water every few seconds to obtain appropriate acoustic waves that propagate into the earth's surface. These waves are reflected at interfaces of the subsurface formations and propagated back to instruments where transducers convert the acoustic waves to electronic signals which are recorded and later processed into a record section for interpretation of the subsurface formations. Marine seismic exploration is of two types, the first type being on water where the seismic source units are strung or towed from a water vehicle. The second type of marine seismic exploration is arctic marine exploration where the seismic source units are disposed below an ice layer to determine the formation of the rock surfaces below the ice layer.

During the past decade, the major marine seismic energy source for both types of exploration has been the air gun. An air gun as in the prior art releases high-pressure air (typically 2000 PSI up to 6000 PSI or even more) into the water to create the desired acoustic wave.

State of the art air guns normally comprise an annular housing that contains means for discharging compressed air through exhaust ports in the housing. Compressed air is stored within the housing in a firing chamber. The only moving component (except for the solenoid triggering device) in the state of the art air guns is a shuttle, which when raised, permits air to escape from the firing chamber through the exhaust ports in the main housing into the surrounding water. The size of the gun is determined by the firing chamber volume selected. By having a constant source of compressed air through an inlet passage in the housing, the upper chamber containing the shuttle is filled and forces the shuttle into a sealed position closing off all exhaust ports from the firing chamber. By using a solenoid valve to allow air flow underneath the shuttle flange thus forcing the shuttle upward and causing an unequal pressuring on the shuttle pistons opposing each other on the shuttle shaft, the shuttle is accelerated in the upward direction exposing the chamber exhaust ports and allowing compressed air to escape into the surrounding water. When the shuttle is in the down, or closed position, the air gun is charged and ready for firing. When fired, the state of the art air gun allows 80-90% of the air in the firing chamber to be exhausted into the water. Consequently, prior art air guns suffer two major disadvantages: first, the efficiency of the air gun for converting stored energy to useful acoustic energy in the seismic passband is well below 10%, and second, the undesirable secondary pressure pulses follow the first acoustic pulse and obscure or confuse the time of the reflected signals.

Several approaches have been taken by the industry to overcome this second disadvantage or undesirable secondary pressure pulses. However, it has been found that the solutions provided are either the cause for a less efficient system of converting stored to acoustic energy or result in greater expense in processing the data. Among the methods presently employed to reduce secondary pulse amplitudes are those that include throttling additional air into the bubble as it forms outside the chamber with a so-called "wave shaping kit", using an array of guns of different sizes, and thus different bubble pulse periods, to destructively reduce the secondary pulses and finally, "signature correction" techniques in data processing to reduce the secondary pulses recorded. "Signature" may be defined as the recorded wavelet or pressure level of the acoustic pressure discharged into the water over a fixed period of time.

Copending United States patent application, Ser. No. 929,883, entitled "Air Release Control in Seismic Energy Source Air Gun", filed July 31, 1978, and assigned to the assignee of this invention, teaches, as a preferred embodiment, an air gun incorporating a secondary shuttle which is activated at the proper moment to cause the closure, by a primary shuttle, of the exhaust ports to further discharge of air from within the air gun.

The present invention utilizes an external sliding valve structure activated by reduced firing chamber pressure resulting from the prior activation of the shuttle whose activation then causes covering of the exhaust ports by the sliding valve itself. The constant source of air pressure causes the shuttle to move downward, sealing off the firing chamber, causing the pressure therein to rise which in turn causes the sliding valve to move back down.

SUMMARY OF THE INVENTION

In accordance with the present invention, a seismic source device is provided having a housing with a provision for an inner chamber for storing compressed air. A first section of the housing has, as in the prior art, two air inlets for providing compressed air passage to the inner chamber. Further, in the first section of the housing, a shuttle unit is provided for sealing off the compressed air in the firing chamber. The shuttle is actuated by a solenoid valve which allows air to force the shuttle in an upward direction, releasing compressed air from the inner chamber.

An external sliding valve is held in a downward position by the pressure of the compressed air in the inner chamber. In the downward position, the sliding valve compresses at least one coil spring so that when the compressed air is released from the firing chamber, the spring force overcomes that pressure remaining in the firing chamber and forces the sliding valve upwardly, the body of the sliding valve then covering the exhaust ports preventing any further escape of air. Alternatively, the coil spring could be replaced by appropriate air pressure. Thus, the firing chamber is by no means exhausted and in face the spring pressure is selected to cause the sliding valve to move upwardly to prevent the escape of most of the air in the firing chamber. This makes the seismic exploration more cost effective, efficient, and reduces undesirable secondary pulses in the acoustic signal.

A constant air pressure source then causes the shuttle to move downwardly, sealing off the firing chamber. The pressure in the firing chamber rises and the sliding valve is forced downwardly into a firing position.

BRIEF DESCRIPTION OF THE DRAWINGS

For a more complete understanding of the present invention, reference may now be made to the following description taken in conjunction with the accompanying drawings in which.

DETAILED DESCRIPTION OF THE DRAWINGS

Figure 1B:
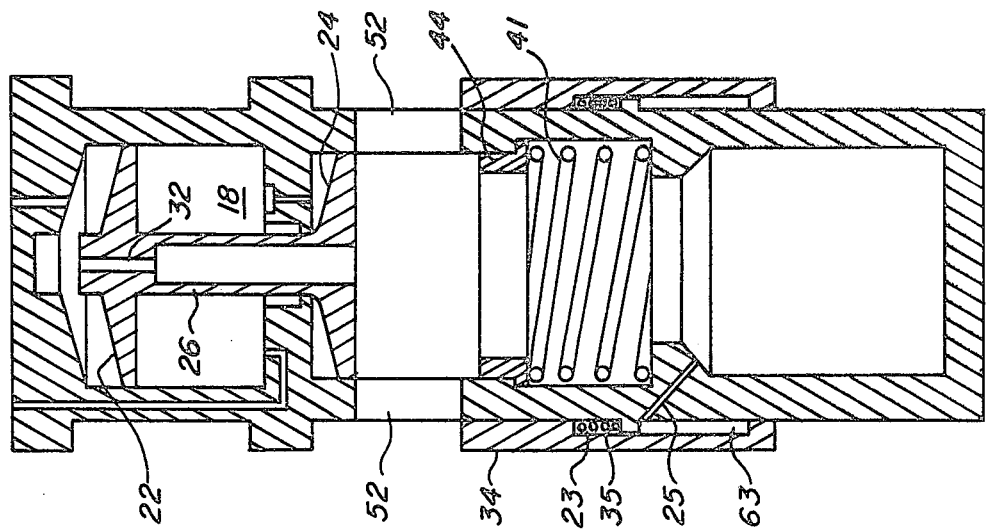
FIGS. 1a-1c illustrate a complete cross sectional view of a seismic source unit in pre-fire, fire and post-fire conditions, in accordance with the present invention.
Figure 1A:
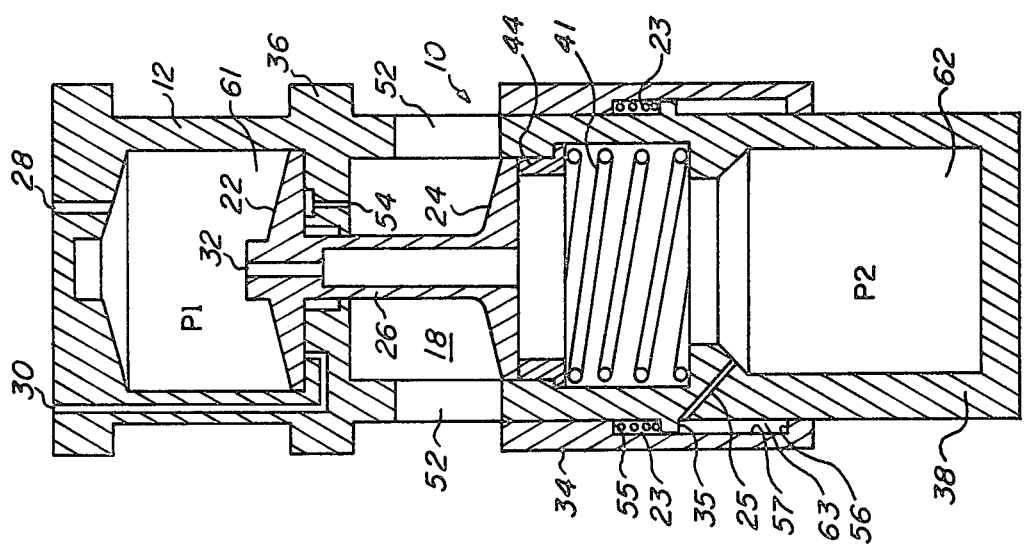

Referring now to the figures and more specifically to FIG. 1a, a seismic source unit displaying shuttle and external sliding valve control is illustrated. The seismic source unit 10 comprises a housing 12 including chamber 61, and chamber 62 otherwise known as the firing chamber. The seismic source unit of the present invention has a shuttle 18 located within the housing 12 and an external sliding valve 34 surrounding housing 12. The shuttle 18 has opposing annular pistons 22 and 24 connected by a shaft 26. A cut out section is formed in external sliding valve 34. This cut out section is defined by inside wall 57, upper wall 55 and lower wall 56. A projection 35 formed on the external surface of housing 12 contacts inner wall 57, forming an upper and lower chamber. The upper chamber contains coil spring 23 which bears against upper wall 55 and the upper surface of projection 35. Coil spring 23 could be replaced by appropriate air pressure within the upper chamber from, for example, chamber 61. The lower chamber 63 is defined by inner surface 57, lower wall 56 and the bottom of projection 35. Pressure P2 is transmitted to chamber 63 by way of orifice 25. Pressure P2 is greater than the combination of the pressure exerted by spring 23 and that exerted by the ambient hydrostatic atmosphere. Therefore, external sliding valve 34 positions itself below exhaust ports 52 prior to firing of the air gun.

The housing 12 provides two air inlet passages 28 and 30. Inlet passage 28 provides compressed air to the inner chambers of housing 12. Inlet passage 30 is further connected to a solenoid valve, (not shown) which actuates the shuttle 18 as described hereinafter.

Shuttle 18 has an orifice 32 formed in the center of shaft 26.

The inner chamber of the seismic air unit 10 may be divided into a plurality of air chambers such as those shown in FIG. 1 labeled 61 and 62. The sliding shuttle 18 is disposed such that the annular piston 22 is capable of seating against cross member structure 36. Shuttle 18 has its shaft 26 sliding through a cut out in cross member 36.

To effectively seat the annular piston 24 when its movement is not restricted by a pressurized air cushion, a resilient seating capability is necessary. Such a capability is made possible by utilizing elastic means which may be in the form of a spring element 41 in combination with annular support member 44.

Figure 2:
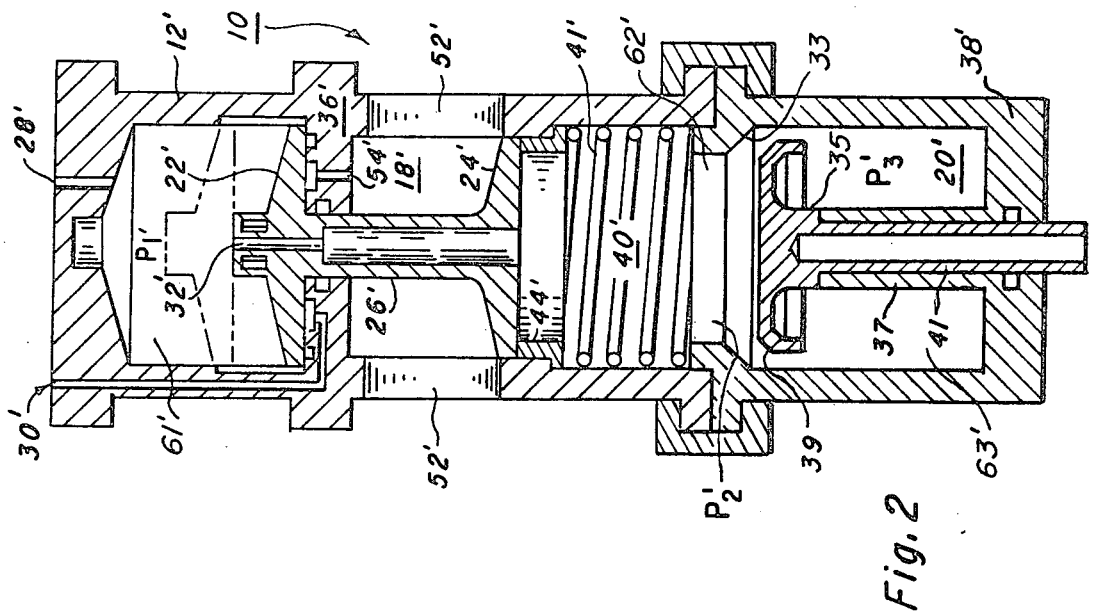
FIG. 2 is a graphical representation of an acoustic pulse signal.
Figure 1C:
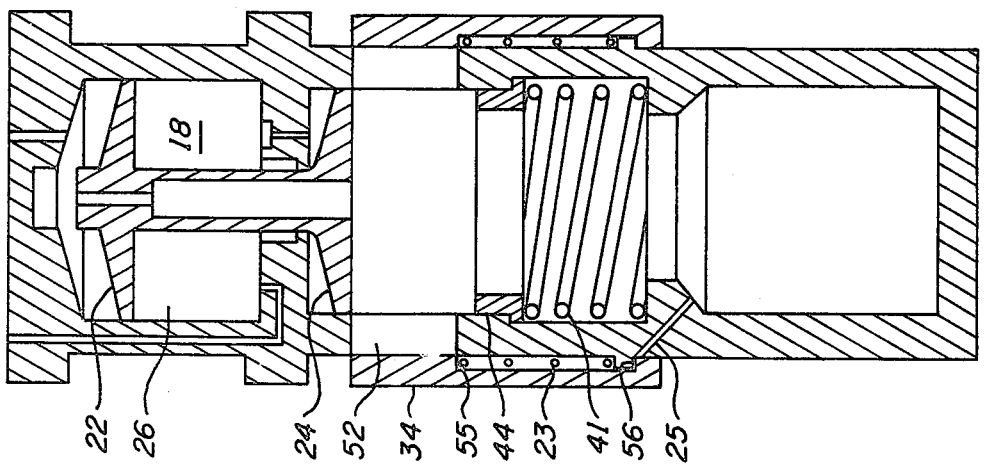
Figure 2:
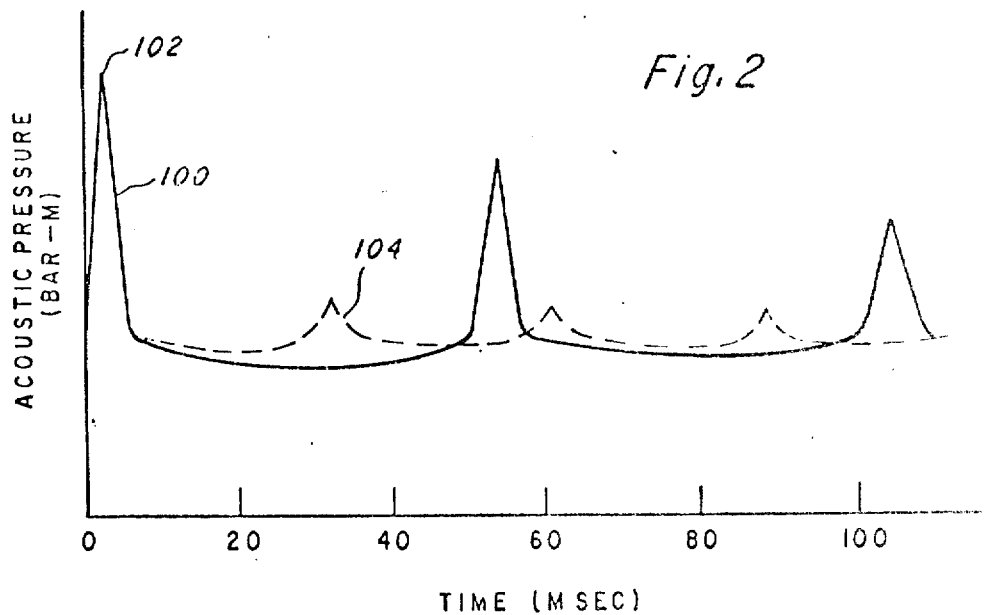
Figure 1C:
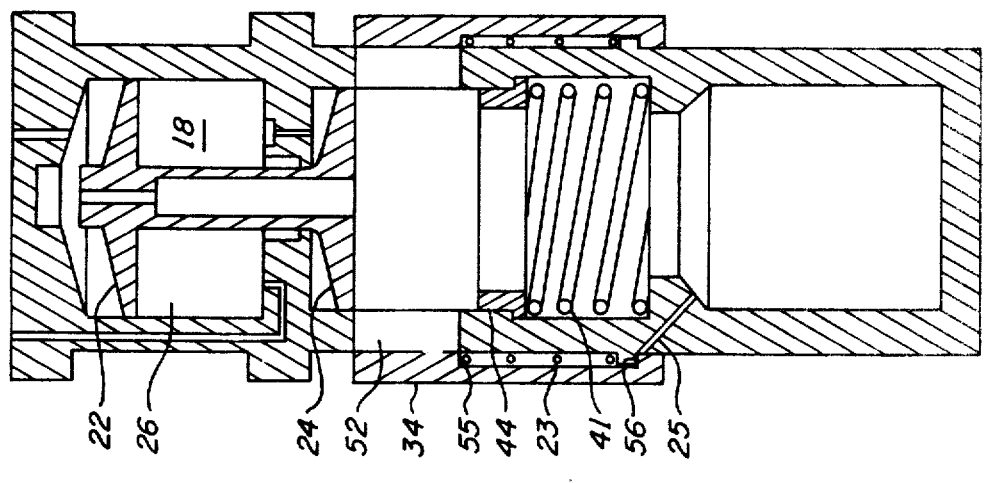

In describing the operation of the seismic source unit 10 found in FIG. 1, it is necessary to refer to FIGS. 1a-1c and 2, with FIG. 2 illustrating an acoustic pulse signal as a function of time. In the prior art, upon the firing of a seismic source unit, a shuttle similar to the shuttle 18 illustrated in FIGS. 1a-1c is forced by use of an actuating means, such as a solenoid element, to force the shuttle upward, thereby moving piston 24 away from annular support member 44, releasing the compressed air found in the lower firing chamber. This action results in an acoustic pulse signal similar to the signal found in FIG. 2 represented by the solid line 100. As can be seen from the graph, the peak output pressure level 102 is reached in a very short time, e.g., 1.3 m sec, for a chamber 62 size of 40 cu. in. at a pressure P2 of 2000 psi, and continuing the firing cycle, i.e., keeping the shuttle in the upward position and allowing further air to escape, results in wasted energy and further causes unwanted oscillating bubbles in the water media which result in secondary acoustic pressure pulses which generally distract from the primary pressure pulse for recording purposes.

In accordance with the present invention utilizing shuttle and external sliding valve control, the unit reduces the firing cycle by effectively closing off the exhaust ports before all the compressed air is discharged from the firing chamber and saves compressed air, i.e., energy, and further reduces secondary pulses thereby enhancing the value of the recorded primary acoustic pulse. A representation of such an acoustic signal from the present invention is the dotted line 104 in FIG. 2. Here the secondary pulses are reduced and do not interfere with the primary pulse.

Operationally, the seismic unit 10 is provided with compressed air from the source of supply through air inlet 28. This compressed air fills chamber 61 prior to filling chambers 62 and 63. As the pressure rises in chamber 61 air is further forced into chamber 62 through orifice 32, and into chamber 63 through orifice 25. Upon being fully charged, and in equilibrium, pressures P1-P3, in chambers 61-63 respectively, are equal.

As compressed air is forced through inlet 28 prior to reaching this equilibrium condition, the shuttle 18 is forced into a downward position where its annular piston 22 seats onto cross member 36, and further seating its annular piston 24 onto angular member 44. Air pressure P2, existent in chamber 63, exerts a force on surface 56 that is larger than the upward force on surface 55 from spring 23 combined with the upward force on sliding valve 34 from the ambient hydrostatic pressure, causing sliding valve 34 into its lower position, below exhaust ports 52. While the seismic source unit 10 is in the equilibrium condition or firing position as illustrated in FIG. 1a, the compressed air in chamber 62 is blocked by the shuttle 18 from the discharge ports 52, thus preventing any compressed air from being discharged into the surrounding water.

FIG. 1b illustrates the seismic air gun after having fired. The shuttle 18 is actuated by actuating a solenoid valve (not shown), forcing air through inlet 30 under annular piston 22, thus releasing the shuttle's seating forces and explosively accelerating it upwardly to the position shown in FIG. 1b. Piston 24 is moved away from annular member 44, thereby permitting the escape of air from chamber 62. This excape of air reduces pressure P2 in chamber 63 to the point where the combined force of spring 23 and the ambient hydrostatic pressure forces sliding valve 34 upward.

FIG. 1c illustrates sliding valve 34 in its upward position covering exhaust ports 52. Notice that spring 23 is fully extended and that bottom surface 56 is engaging the bottom of projection 35. In this manner, further escape of air from chamber 62 is prevented.

The continuing air pressure from inlet 28 forces shuttle 18 back into its downwardly position with piston 24 seating against annular member 44. This causes pressure P2 in chamber 62 to begin rising and also to be exerted through orifice 25 and chamber 63 as well. When P2 rises sufficiently, it overcomes the forces exerted by spring 23 and the ambient hydrostatic pressure thereby causing sliding valve 34 to again move to its lower position as shown in FIG. 1a, ready for firing.

While the invention has been described and illustrated with respect to a specific embodiment, it is understood that changes or modifications can be made without departing from the spirit and scope of the invention described herein.

What is claimed is:

1. A seismic energy source apparatus having a housing defining at least one exhaust port and an inner chamber for storing compressed air, and containing a shuttle having first and second pistons disposed generally parallel to each other at opposite ends of a shaft with an orifice therethrough, having a first air supply means for providing compressed air to the chamber and having a second air supply means controlled by actuating means for supplying air pressure under the first piston to cause the shuttle to move upwardly, comprising:
    (a) seating means disposed within the chamber against which the first piston seats;
    (b) resilient seating means disposed within the chamber against which the second piston seats; and
    (c) an exterior sliding valve slidably mounted to the exterior surface of the housing, actuable upon the shuttle moving upwardly to slide upwardly and cover the exhaust port.

2. The apparatus of claim 1 wherein the seating means comprises a member attached to the walls of the inner chamber having an inlet for receiving the second air supply means and an outlet therethrough for exhausting air from the second air supply means.

3. The apparatus of claim 1 wherein the resilient seating means comprises a compressable spring having a support member bearing against its top surface to form a seat for the second piston.

4. The apparatus of claim 1 wherein the housing has an orifice formed from its inner chamber to its outer surface and the external sliding valve has a cut out section from its inner surface, forming an exterior chamber with the outer surface of the housing, the housing orifice communicating with the exterior chamber to equalize pressure therebetween.

5. The apparatus of claim 4 further comprising:
    (d) at least one compression spring; and
    (e) a projection attached to the outer surface of the housing, positioned below the exhaust port, and contacting the inner surface of the cut out section, the compression spring positioned to contact the sliding valve at one end of the cut out section and to contact the projection to provide a force tending to move the sliding valve upwardly with respect to the housing.

6. The apparatus of claim 2 wherein the housing has an orifice formed from its inner chamber to its outer surface and the external sliding valve has a cut out section from its inner surface, forming an exterior chamber with the outer surface of the housing, the housing orifice communicating with the exterior chamber to equalize pressure therebetween.

7. The apparatus of claim 6 further comprising:
    (d) at least one compression spring; and
    (e) a projection attached to the outer surface of the housing, positioned below the exhaust port, and contacting the inner surface of the cut out section, the compression spring positioned to contact the sliding valve at one end of the cut out section and to contact the projection to provide a force tending to move the sliding valve upwardly with respect to the housing.

8. The apparatus of claim 3 wherein the housing has an orifice formed from its inner chamber to its outer surface and the external sliding valve has a cut out section from its inner surface, forming an exterior chamber with the outer surface of the housing, the housing orifice communicating with the exterior chamber to equalize pressure therebetween.

9. The apparatus of claim 8 further comprising:
    (d) at least one compression spring; and
    (e) a projection attached to the outer surface of the housing, positioned below the exhaust port, and contacting the inner surface of the cut out section, the compression spring positioned to contact the sliding valve at one end of the cut out section and to contact the projection to provide a force tending to move the sliding valve upwardly with respect to the housing.

* * * * *

UNITED STATES PATENT AND TRADEMARK OFFICE
CERTIFICATE OF CORRECTION

PATENT NO. : 4,219,097

DATED : August 26, 1980

INVENTOR(S) : Earnest R. Harrison, et al

It is certified that error appears in the above—identified patent and that said Letters Patent is hereby corrected as shown below:

Sheet 2 of the drawings should be deleted to insert the attached sheet therefor.

Signed and Sealed this

Twenty-fifth Day of November 1980

[SEAL]

Attest:

SIDNEY A. DIAMOND

Attesting Officer

Commissioner of Patents and Trademarks